INVENTORS
Robert M. Tuck, &
Kenneth B. Harmon

A. M. Heiter
ATTORNEY

United States Patent Office 3,371,555
Patented Mar. 5, 1968

3,371,555
TRANSMISSION
Robert M. Tuck and Kenneth B. Harmon, Indianapolis, Ind., assignors to General Motors Corporation, Detroit, Mich., a corporation of Delaware
Filed Sept. 27, 1965, Ser. No. 490,181
3 Claims. (Cl. 74—677)

ABSTRACT OF THE DISCLOSURE

A transmission having a torque converter combined with a multiratio gear unit to provide torque converter and reduction gear ratio series drive in the lowest drive range and split torque drive in the higher drive ranges. The converter's stator is connected by a one-way clutch to the transmission output so that during converter operation in all of the forward drive ranges the stator reaction is directly subtracted from the output and the stator is permitted to run faster than the transmission output for increased efficiency in the coupling stage. The stator connection also provides for input power to be fed from the gear unit back to the torque converter for increased converter performance in the higher drive ranges.

---

Figure 1:
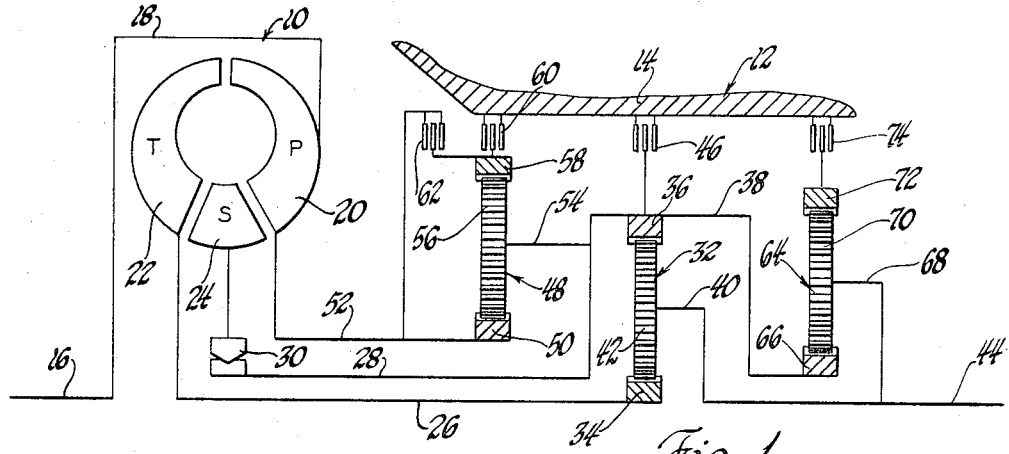

This invention relates to a transmission and more particularly to a torque converter and multiratio gear unit transmission providing single and plural power path drive.

The transmission, according to this invention, employs a hydrodynamic torque converter and a three forward speed and reverse gear unit married to provide torque converter and reduction gear ratio series drive in a low and a reverse drive range and hydraulic-mechanical split torque drive in an intermediate and a high drive range. In the intermediate and high drive range, a portion of the input power is returned from the gear unit to the torque converter for increased converter performance with the available input power.

The transmission includes a torque converter having a pump driven by a transmission input shaft, a turbine and a stator. The stator is connected by a one-way clutch to the ring gear of a low planetary gear set which has a sun gear driven by the turbine and a carrier connected to a transmission output shaft so that when the ring gear is retarded, a torque converter drive to the speed reducing and torque multiplying ratio of the low gear set is effected to provide the low drive range. The input shaft also drives the sun gear of an intermediate planetary gear set which has a ring gear and a carrier which carrier is connected to the low ring gear and is also connected to the converter stator via the one-way clutch. The intermediate ring gear is retarded to provide an intermediate ratio drive to the low ring gear and to drive the converter stator in a forward direction at a reduced speed for increased converter performance. The low gear set is thus provided with plural input drives, one a speed reduction mechanical drive and the other a hydraulic drive. The low gear set then acts as a torque combiner and speed differential gear unit to drive the output shaft at a higher speed in the intermediate drive range than that obtained in low. The high drive range is provided by locking up the intermediate planetary gear set so that there is provided a direct mechanical drive from the input shaft to the intermediate carrier and thus to the low ring gear and the converter stator. As in the intermediate drive range, input power is transmitted by the intermediate gear set back to the stator for increased converter performance and the low gear set combines the direct mechanical drive and the hydraulic drive to provide the high drive range which at converter coupling speed has the output shaft rotating substantially at input shaft speed. Reverse is provided by a reverse planetary gear set which has a sun gear connected to the low ring gear and thus via the one-way clutch to the converter stator, a carrier connected to the output shaft and a ring gear which is retarded to establish the reverse drive range.

An object of this invention is to provide in a transmission, a single power path drive with a series arranged hydraulic drive and reduction gear ratio drive and also a plural power path drive with a speed reduction mechanical drive in parallel with the hydraulic drive and arranged so that the mechanical drive provides input power feedback to the hydraulic drive.

Another object of this invention is to provide in a transmission, a hydrodynamic torque converter combined with a multiratio gear unit to provide torque converter and reduction gear ratio series drive in a lowest drive range and split torque drive in the higher drive ranges in which input power is fed from the gear unit back to the torque converter for increased converter performance.

Another object of this invention is to provide in a transmission, a hydrodynamic torque converter combined with a three forward speed and reverse gear unit to provide torque converter and reduction gear ratio series drive in a low and a reverse drive range and split torque drive in an intermediate and a high drive range with input power being fed from the gear unit back to the torque converter in the intermediate and high drive range.

Another object of this invention is to provide in a transmission having a torque converter including a pump, a turbine, a stator and a multispeed ratio gear unit, a new and improved means for increasing the performance of the converter and for providing split torque drives including a one-way clutch providing a connection between the converter stator and the elements of the gear unit during the split torque drives so that input power can be fed back to the stator for increased converter performance and the stator is available as a second source of hydraulic torque from the converter.

These and other objects of the invention will become more apparent from the following description and drawing in which:

FIGURE 1 diagrammatically shows a transmission according to the invention.

Figure 2:
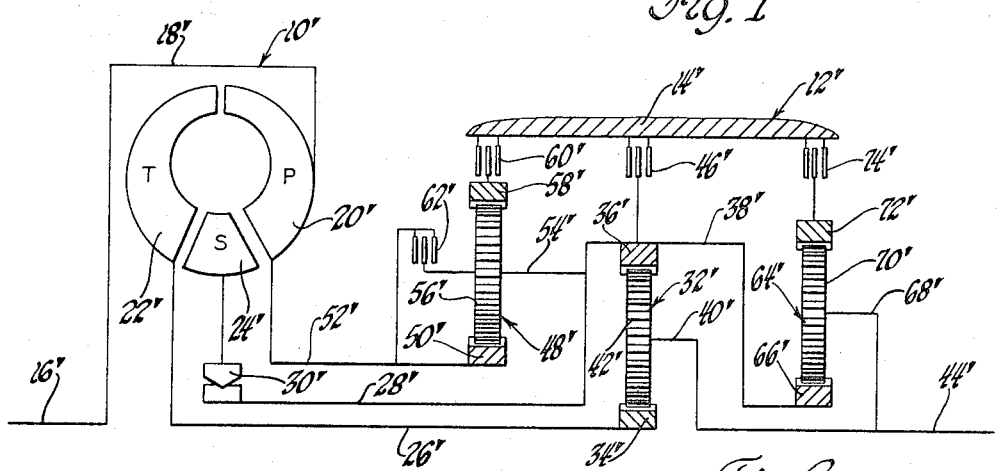

FIGURE 2 diagrammatically shows a modification of the FIGURE 1 embodiment.

Figure 3:
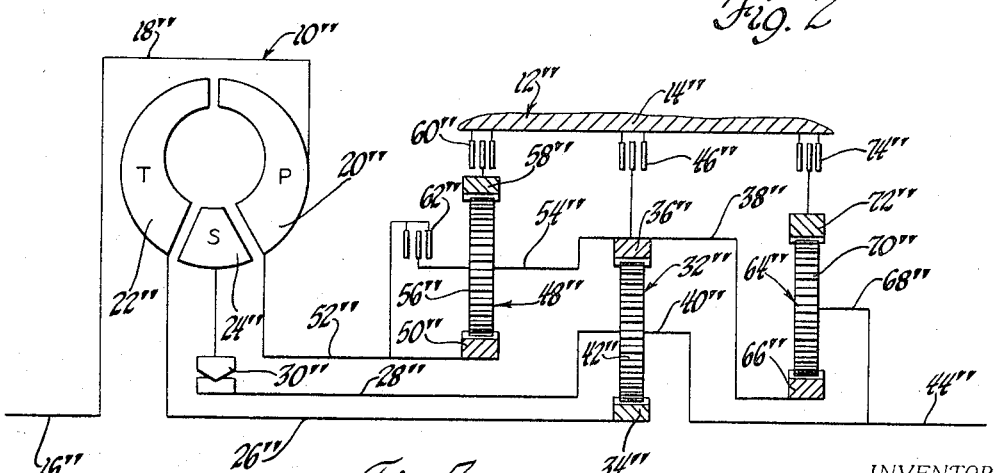

FIGURE 3 diagrammatically shows another modification of the FIGURE 1 embodiment.

The embodiment shown in FIGURE 1 has a hydrodynamic torque converter unit 10 married to a three forward speed and one reverse speed range gear unit 12. These units are arranged coaxially and in a housing generally designated at 14.

An input shaft 16 which can be driven by any suitable prime mover such as a piston engine is connected at converter unit 10 by a pump housing 18 to a vaned pump or impeller 20. Pump housing 18 generally provides the rotating torque converter housing enclosing the torque converter blading which in addition to the pump 20 includes a vaned turbine 22 and a vaned stator 24. The turbine 22 is connected to a turbine shaft 26 extending out of the converter for connection to the range unit. Stator 24 is mounted on a sleeve shaft 28 surrounding turbine shaft 26 by a one-way coupling or clutch 30 which prevents the stator from rotating relative to shaft 28 only in a direction opposite the forward direction of the pump. The blading is of conventional design and provides a toroidal path for the fluid with torque multiplication being made available by the stator via its one-way connection with the range unit as described in detail later.

Referring now to the range gearing, the gear unit 12 has a low planetary gear set 32 comprising a sun gear 34 connected to turbine shaft 26, a ring gear 36 carried on a drum 38, which drum is connected to the one-way clutch shaft 28, and a carrier 40 having pinions 42 meshing with sun gear 34 and ring gear 36. The carrier 40 is connected to an output shaft 44 coaxial with input shaft 16 and a low brake 46 is provided which brake, when engaged, brakes the drum 38 and thus ring gear 36 and one-way clutch shaft 28. An intermediate gear set 48 has a sun gear 50 connected to the pump housing 18 and thus input shaft 16 via a sleeve shaft 52 surrounding sleeve shaft 28. A carrier 54 is connected to drum 38 and thus low ring gear 36 and one-way clutch shaft 28 and has pinions 56 mounted thereon meshing with sun gear 50 and a ring gear 58. An intermediate brake 60, when engaged, provides for braking of the intermediate ring gear 58. Lockup of gear set 48, to provide a direct drive between shaft 52 and intermediate carrier 54, is established by a high clutch 62, which clutches ring gear 58 to shaft 52. Reverse in the range gearing is provided by planetary gear set 64. This reverse gear set has a sun gear 66 connected to drum 38 and thus one-way clutch shaft 28 and a carrier 68 connected to output shaft 44. Pinions 70 carried on the carrier 68 mesh with sun gear 66 and a ring gear 72 which ring gear can be braked by a reverse brake 74.

The brakes and clutch or friction drive establishing devices of the range unit are of conventional design and can be operated either hydraulically, pneumatically, mechanically or by some other provision and in a certain sequence.

The transmission is capable of providing three forward drive ranges and one reverse drive range with a decreasing percentage of hydraulic torque and a corresponding increase in mechanical torque on each upshift in forward drive by the output split torque drives thus provided. Describing now the operation of the transmission, the lowest drive range, which is the drive range producing the greatest torque multiplication and speed reduction, is provided by engaging the low brake 46, all other drive establishing devices being disengaged. This brake engagement grounds the low ring gear 36 and also grounds sleeve shaft 28 so that the one-way clutch 30 is effective to prevent the stator 24 from rotating in reverse. Then with the input shaft 16 being accelerated from zero speed to a normal operating speed for this drive range, the pump 20 is accelerated in the forward direction. The pump 20 discharges fluid to the turbine 22 in the same direction as the pump is rotated, to rotate the turbine in the forward direction, and the stator 24 since it is prevented from reverse rotation by one-way clutch 30 serves as the reaction member and discharges fluid in the same direction as the pump rotates to provide torque multiplication. Thus, maximum torque multiplication is obtained at stall which torque multiplication decreases on increasing speed of the turbine until finally when the turbine attains coupling speed there is no reaction at the stator 24 and the stator is thereafter free to rotate or freewheel in the forward direction since the one-way clutch 30 only prevents reverse rotation. When the turbine shaft 26 and the sun gear 34 thus being driven, there is provided a hydraulic path in series with the low gear set 32 which multiplies the torque available to the sun gear 34 to drive the output shaft 44 forwardly with increased torque at a reduced speed. Thus, in the lowest drive range the converter 10 and the low gear set 32 are in series to provide a single power path from input shaft 16 to output shaft 44.

The intermediate drive range is obtained by engaging the intermediate brake 60 while all other friction drive establishing devices are disengaged. With brake 60 engaged, the input power from shaft 16 splits or divides into two paths for delivery to the low gear set 32, one power path being to the converter pump 20 and the other power path being to the sun gear 50 of intermediate gear set 48. That part of the input power that goes to the sun gear 50 is further divided into two power paths after the torque multiplication provided by the gear set 48, one power path being to the low ring gear 36 via the carrier 54 and the other power path being to the stator 24 via the carrier 54 and the one-way clutch 30. The power going to the converter stator 24 is used to drive the stator in a forward direction at a reduced speed. This forward rotation of the stator 24 accelerates the fluid in the converter and thus reduces the amount of power required by the pump 20 to sustain a given power level on the turbine 22. In this manner the power delivered to the converter via the stator 24 is not lost power, but improves the performance of the converter relative to the pump power level.

The output power of the low output carrier 40 is the summation of the power on the low ring gear 36 and the low sun gear 34 which carrier rotates at a speed proportional to the speed differential of the two input gears 34 and 36. Thus, the low gear set 32 then acts as a speed differential gear unit with two inputs and the speed of output carrier 40 is higher than that obtained in the low drive range since the low ring gear 36 is now being driven forwardly instead of being held as in low. It will also be appreciated that it is only possible to feed power into the converter via the stator 24 if the stator would normally, at the given condition, run slower than its driving intermediate carrier 54. At high turbine pump speed ratios, the stator 24 will want to run faster than the intermediate carrier 54 due to the direction of fluid flow in the converter and when this condition arises the one-way clutch 30 allows the stator to run faster and therefore breaks the connection between the stator and the intermediate carrier. Thus, it will be observed that on the upshift from low to intermediate, a decreasing percentage of hydraulic torque in the drive through the transmission has been provided since a mechanical power path has been added in the intermediate drive range in parallel with the hydraulic power path.

The high drive range is obtained by engaging the high clutch 62 while all other friction drive establishing devices are disengaged. This clutch engagement locks up intermediate gear set 48 so that there is then a direct mechanical drive from input shaft 16 to the intermediate carrier 54. Again, the input power from shaft 16 divides into two paths, one to the converter pump 20 and one to the locked intermediate gear set 48. The power out of intermediate gear set 48 is divided also into two power paths, one to the low ring gear 36 and one to the stator 24 via the one-way clutch 30. As in the intermediate drive range, the power to the stator 24 is fed back into the converter but since there is no speed differential between the pump and the stator, the torque ratio within the converter is equal to one. This may more easily be understood by noting that nowhere is there a grounded converter member to allow torque multiplication in the converter. With the stator 24 running at pump speed at all conditions, the capacity of the hydrodynamic device is thus increased. This means that for a given output speed of the converter the slip within the converter is less and therefore the converter is operating at a more efficient level than it would were the capacity not increased.

Output power at the carrier 40 in high drive is again the summation of the power on the low ring gear 36 and the low sun gear 34 and with the drive thus provided there will be substantially a 1:1 speed ratio drive between the input shaft 16 and the output shaft 44 when the turbine 22 is at the coupling speed. Since the torque ratio in the mechanical path to the low ring gear 36 has been decreased to 1:1, the percentage of hydraulic torque available to low sun gear 34 has been decreased and a corresponding increase in percentage of mechanical torque to the low ring gear 36 has been provided which would occur on each upshift to high. Thus, an efficient direct drive is obtained in the high drive range without directly clutching or locking the turbine 22 to the input shaft 16 since only a small portion of input power is transmitted through the converter which results in a minimum of slippage power loss.

For reverse only the reverse brake 74 is engaged and with the reverse ring gear 72 thus held, the carrier 68 and connected output shaft 44 are driven in a direction opposite input shaft 16 and at a reduced speed relative thereto and by a drive which has hydraulic torque in two power paths to the output shaft 44 during converter torque multiplication operation and hydraulic torque in only one path during converter coupling operation. This can be best understood by recognizing that the stator 24 during torque multiplication operation is driven in the reverse direction and acts through the one-way clutch 30 to aid the turbine 22 and connected low sun gear 34 in driving the low ring gear 36 and connected reverse sun gear 66 in reverse. At converter coupling speed there is no reaction at the stator so that its contribution to the reverse drive is broken. Thus, in the reverse drive the stator drive boosts the effective converter torque ratio to provide a high starting torque ratio while maintaining top reverse speed as determined by the reverse gear set ratio.

In the FIGURE 1 embodiment the high clutch 62 is located so that the intermediate ring gear 58 serves as a rotatable member common to both the intermediate brake 60 and the high clutch 62 to enable all of the clutch and brake plates to be of identical design. The high clutch can also be arranged as shown in FIGURE 2 which has like numerals for identifying corresponding parts shown in FIGURE 1 with the numerals appearing in FIGURE 2 being primed. In this arrangement the high clutch 62' is for clutching shaft 52' and connected intermediate sun gear 50' directly to the intermediate carrier 54'. The FIGURE 2 embodiment with high clutch 62' will thus operate the same as the FIGURE 1 embodiment with high clutch 62.

In both the FIGURE 1 and FIGURE 2 embodiments the stator is connected by the one-way clutch with the ring gear of the low gear set and the carrier of the intermediate gear set so that input power can be fed from the gear unit back to the torque converter in the intermediate and high drive range and so that the stator is available as a second source of hydraulic torque from the converter for reverse drive. The stator can also be integrated into the gear unit as shown in FIGURE 3 which has like numerals for identifying corresponding parts shown in FIGURE 1 with the numerals appearing in FIGURE 3 being double primed. In this arrangement the one-way clutch shaft 28" is connected by the carrier 40" to the output shaft 44" and is not connected to either the low ring gear 36" or the carrier 54" so that during converter operation in all the forward drive ranges the stator reaction is directly subtracted from the output shaft 44". The FIGURE 3 high clutch 62" is arranged like the FIGURE 2 high clutch 62'.

Thus, in the low drive range with the low brake 46" engaged, the output torque at stall will be less than that in the FIGURE 1 and FIGURE 2 embodiments and the coupling speed will occur later since the stator 24" is now driven forwardly by the output shaft 44" instead of being grounded as in the FIGURE 1 and FIGURE 2 embodiments. In low drive and also in intermediate drive with intermediate brake 60" engaged and in high drive with high clutch 62" engaged, the power going to the converter stator 24" from the output shaft 44" is used to drive the stator in the forward direction. This forward rotation of the stator 24" accelerates the fluid in the converter and thus reduces the amount of power required by the pump 20" to sustain a given power level on the turbine 22", recognizing that it is only possible to feed power into the converter via the stator 24" if the stator would normally at the given condition run slower than its driving output shaft 44". At high turbine pump speed ratios where the stator 24" wants to run faster than the output shaft, the one-way cluch 30" breaks the drive connection between the stator and the output shaft to permit this operation. In reverse with the reverse brake 74" engaged stator torque acts directly on the output shaft 44" and therefore is an additive torque and boosts the effective torque ratio to provide a high starting torque ratio while maintaining top reverse speed as determined by the reverse gear set ratio.

The above-described preferred embodiments are illustrative of the invention which it will be appreciated may be modified within the scope of the appended claims.

What is claimed is:
1. In a transmission the combination of
 (a) an input shaft, an output shaft,
 (b) a torque converter having a pump, a turbine and a stator, said pump being connected to said input shaft,
 (c) first planetary gear means having a first, a second and a third member, said first member being connected to said turbine, said second member being connected to said output shaft,
 (d) second planetary gear means having a first, a second and a third member, said first member being connected to said input shaft, said second member being connected to said third member of said first gear means, a brake for holding said third member,
 (e) and a one-way clutch for connecting said stator and said second member of said first gear means.
2. In a transmission the combination of
 (a) an input shaft, an output shaft,
 (b) a hydrodynamic torque converter comprising a pump, a turbine and a stator, said pump being connected to said input shaft,
 (c) a first planetary gear set comprising a first sun gear, a first ring gear and a first carrier having pinions meshing with said first sun gear and said first ring gear, said first sun gear being connected to said turbine, said first carrier being connected to said output shaft, a brake for holding said first ring gear,
 (d) a second planetary gear set comprising a second sun gear, a second ring gear and a second carrier having pinions meshing with said second sun gear and said second ring gear, said second carrier being connected to said output shaft, said third sun gear being connected to said input shaft, a brake for holding said second ring gear, a clutch for locking up said second gear set,
 (e) and a one-way coupling for connecting said stator and said first carrier.
3. The transmission set forth in claim 2 and a third planetary gear set having a third sun gear, a third ring gear and a third carrier having pinions meshing with said third sun gear and said third ring gear, said third carrier being connected to said output shaft, said third sun gear being connected to said first ring gear, a brake for holding said third ring gear.

References Cited
UNITED STATES PATENTS

| | | | |
|---|---|---|---|
| 2,324,713 | 7/1943 | McFarland | 74—688 |
| 2,572,007 | 10/1951 | Burtnett | 74—688 X |
| 3,132,535 | 5/1964 | Borman et al. | 74—688 |
| 3,273,420 | 9/1966 | O'Malley | 74—677 |
| 3,295,392 | 1/1967 | Scheiter | 74—677 |

ROBERT M. WALKER, *Primary Examiner.*

THOMAS C. PERRY, *Examiner.*

UNITED STATES PATENT OFFICE

CERTIFICATE OF CORRECTION

Patent No. 3,371,555                  March 5, 1968

Robert M. Tuck et al.

It is certified that error appears in the above identified patent and that said Letters Patent are hereby corrected as shown below:

Column 6, lines 45 and 46, strike out "being con-being connected to said output shaft, said tnird sun gear" and insert instead -- being connected to said first ring gear, said second sun gear --.

Signed and sealed this 8th day of July 1969.

(SEAL)
Attest:

Edward M. Fletcher, Jr.                 WILLIAM E. SCHUYLER, JR.
Attesting Officer                            Commissioner of Patents